United States Patent [19]
Braski et al.

[11] Patent Number: 4,737,964
[45] Date of Patent: Apr. 12, 1988

[54] RF DISCHARGE SUPPRESSION IN LOW PRESSURE GAS DEVICES

[75] Inventors: Michael T. Braski; Dwight H. Everett, both of Encinitas; John C. Hamacher, Vista; J. Samuel Mueller, Manhattan Beach; Paul F. Robusto, Carlsbad; Richard A. Tilton, San Diego, all of Calif.

[73] Assignee: Hughes Aircraft Company, Los Angeles, Calif.

[21] Appl. No.: 797,367

[22] Filed: Nov. 12, 1985

[51] Int. Cl.[4] ............................................. H01S 3/097
[52] U.S. Cl. ....................................... 372/82; 372/83; 372/87
[58] Field of Search ............... 372/82, 83, 87; 445/28, 445/49

[56] References Cited
U.S. PATENT DOCUMENTS 4,317,067  2/1982  Fitzsimmons et al. ............. 315/150
4,359,777  11/1982 Fox et al. ........................... 372/82
4,633,478  12/1986 Robusto ............................. 372/83

Primary Examiner—James W. Davie
Assistant Examiner—B. Randolph
Attorney, Agent, or Firm—Joseph E. Szabo; Anthony W. Karambelas

[57] ABSTRACT

An RF laser structure (10) is disclosed which includes an elongated laser excitation cavity (27) and an electrode structure (20) for suppressing extraneous RF discharges outside of the laser cavity. The electrode structure includes an electrode (41) adjacent the elongated laser cavity (27) and extending along the laser cavity; a conductive structure (43, 45) adjacent and conductively coupled to the electrode (41) for shielding the electrode and for providing smooth conductive surfaces; and a dielectric filler (47) encapsulating the electrode and the conductive structure, and for controlling the electric field generated by the electrode structure so that extraneous discharges are suppressed. Also disclosed is a method for making a laser electrode structure which includes the steps of forming an electrode adjacent the elongated laser cavity, and encapsulating the electrode with a dielectric potting material.

22 Claims, 2 Drawing Sheets

RF DISCHARGE SUPPRESSION IN LOW PRESSURE GAS DEVICES

BACKGROUND OF THE INVENTION

The disclosed invention generally relates to transverse discharge excitation lasers, and is particularly directed to an electrode structure for transverse discharge excitation lasers which minimizes extraneous electrode or feed related discharges.

In a transverse discharge excitation laser, an RF excitation electric field is applied transverse to the longitudinal dimension of a laser excitation cavity. An example of a transverse discharge excitation laser is set forth in U.S. Pat. No. 4,169,251, issued to Laakmann on Sept. 25, 1979, and assigned to the assignee of the present invention. In the system of U.S. Pat. No. 4,169,251, the electrodes form two opposing walls of the laser cavity. Such electrodes are internal electrodes which are in contact with the laser gas subject to the RF excitation field.

Further examples of transverse discharge excitation lasers are set forth in U.S. application Ser. No. 745,570, filed on June 17, 1985, by P. F. Robusto, and assigned to the assignee of the subject invention. Included therein are examples of laser structures wherein the electrodes are dielectrically isolated from the laser cavity. Such electrodes are external to the laser cavity and are not in contact with the laser gas subject to the RF excitation field.

In operation, the laser gas should be in contact with a larger gas reservoir to provide for a longer laser lifetime. The foregoing can be accomplished by one of several techniques. With one technique, the laser cavity is hermetically sealed as a vacuum vessel and is in communication with a separate gas ballast volume. With another technique, the laser structure is contained within a vacuum vessel which is filled with the laser gas.

Considerations involved in the use of a hermetically sealed laser cavity include the complexity of achieving a proper seal, which may be particularly difficult for long laser structures and for folded laser structures. Another consideration with the use of a hermetically sealed laser cavity is the connection between the laser cavity and the separate gas volume, since such connection tends to be fragile. Further, the hermetic seals also tend to be fragile, and as a result of difficult and complex manufacturing requirements cause low manufacturing yield.

Considerations involved in the use of a vacuum vessel-contained RF laser structure include extraneous RF discharges outside the laser cavity. Typically, the vacuum vessel is made of a conductive metallic material for strength, ease of manufacture, and use as an RF shield. An important cause of extraneous RF discharges is the capacitive coupling between the conductive vacuum vessel and non-grounded electrode(s) that is created by the dielectric structure of the laser. Sharp edges in an electrode produce localized electric fields of sufficient intensity to cause discharges of the non-active laser gas outside the laser cavity.

It should be noted that techniques for suppressing extraneous discharges in DC lasers are generally inapplicable to RF lasers. For example, in DC lasers ceramic may be utilized as insulation for suppressing extraneous discharges. Such use of ceramic in RF lasers would provide increased capacitive coupling that would tend to promote extraneous discharges.

A known approach to avoiding extraneous discharges in vacuum vessel-contained RF laser structures is the use of bulk internal electrodes which cooperate with a ceramic structure to define the laser cavity. However, the different thermal coefficients of the electrodes and the ceramic are an important consideration with respect to achieving and maintaining proper alignment.

Extraneous RF discharges may also be avoided by providing sufficient separation between the non-grounded electrode(s) and the vacuum vessel to eliminate extraneous RF discharges. However, that would result in larger and more costly lasers.

A further technique for preventing extraneous RF discharges in vacuum vessel-contained RF laser structures is the use of gas pressures and/or excitation frequencies which are higher than optimum. However, higher pressures require higher operating voltages and reduce laser operating efficiency. Higher operating frequencies may reduce laser operating efficiency, and may exceed the FCC specified operating frequency, which would either require obtaining an FCC exemption or preclude commercial applications.

SUMMARY OF THE INVENTION

It would therefore be an advantage to provide for a vacuum vessel-contained RF laser structure an electrode structure which in addition to minimizing extraneous RF discharges also achieves one or more of the following:

(a) allows for the use of a compact conductive vacuum vessel;

(b) allows for the use of optimum gas pressures and excitation frequencies;

(c) allows for operation over wider ranges of operating frequencies, power loading, and gas laser pressures;

(d) provides for higher manufacturing yield;

(e) allows for longer laser operating lifetimes;

(f) has particular utility in folded laser structures.

The foregoing advantages and features are provided in an RF laser electrode structure which includes an electrode adjacent an elongated laser cavity and extending along the laser cavity; a conductive structure adjacent and conductively coupled to the electrode for shielding the electrode and for providing smooth conductive surfaces; and a dielectric potting structure entirely encapsulating the electrode and the conductive structure, in conjunction with the dielectric block so as to suppress extraneous discharges by controlling the electric fields generated when RF energy is applied to the electrode structure.

The invention further includes a method of making a laser electrode structure for a laser having an elongated laser cavity. The method includes the steps of forming an electrode adjacent the laser cavity, and encapsulating the electrode with a dielectric potting material.

BRIEF DESCRIPTION OF THE DRAWING

The advantages and features of the disclosed invention will readily be appreciated by persons skilled in the art from the following detailed description when read in conjunction with the accompanying drawing wherein.

DETAILED DESCRIPTION OF THE DISCLOSURE

Figure 1:
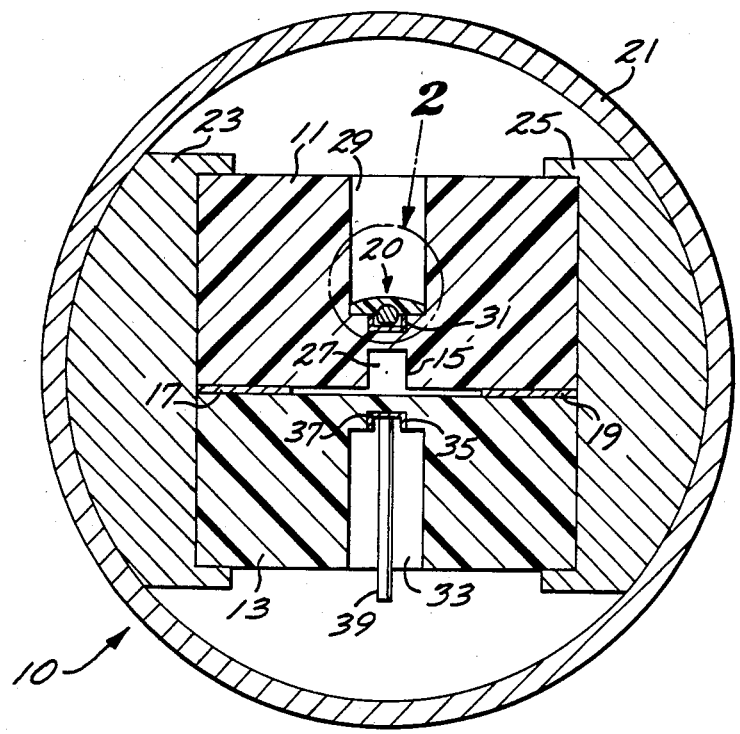
FIG. 1 is a sectional view of a vacuum vessel contained laser system which utilizes the electrode structure of the invention.

In the following detailed description and in the several figures of the drawing, like elements are identified with like reference numerals.

Referring now to FIG. 1, shown therein is an RF laser system 10 which includes an elongated top dielectric block 11 and an elongated bottom dielectric block 13, which are aligned with their longitudinal axes in parallel.

The top elongated dielectric block 11 includes a centrally located downward facing channel 15 between substantially flat bottom surfaces. The downward facing channel 15 extends along the longitudinal axis of the top elongated dielectric block 11. The bottom elongated dielectric block 13 includes a substantially flat top surface which is secured to the outer portions of the bottom surfaces of the dielectric block 11 by brazed metal regions 17, 19. The dielectric blocks 11, 13 are mechanically clamped within a metal tube 21 between two metal spacers 23, 25. The outside portion of each of the metal spacers 23, 25 is arcuately shaped to conform to the inside curvature of the metal tube 21. The inside portion of each of the metal spacers 23, 25 is recessed to accept the sides of the top and bottom dielectric blocks 11, 13.

Instead of being secured by brazing, the top and bottom dielectric blocks 11, 13 may be secured to each other with an appropriate adhesive or by the mechanical clamping provided by the metal spacers 23, 25 and the metal tube 21.

The gap formed by the brazed metal regions 17, 19 between the bottom surfaces of the dielectric block 11 and the top surface of the dielectric block 13 is relatively small in comparison to the dimensions of the downward facing channel 15. Thus, the channel 15 cooperates with the top surface of the bottom dielectric block 13 to form an elongated laser excitation cavity 27 having opposing top and bottom walls and opposing side walls, and which is substantially rectangular in cross-section.

The top dielectric block 11 further includes a centrally located upwardly facing channel 29. A groove 31 is formed in the bottom of the channel 29 adjacent the top wall of the laser cavity 27, and contains an exciter electrode structure generally identified with the reference number 20. The exciter electrode structure 20 is coupled to a source of RF energy (not shown) via appropriate feeds (not shown). The exciter electrode structure 20 extends for a large portion of the longitudinal dimension of the laser cavity 27.

It should be understood that the channel 29 ma be formed without the groove 31, in which case the exciter electrode structure would be against the flat bottom of the channel 29.

The bottom dielectric block 13 further includes a downwardly facing channel 33. A groove 35 is formed in the top of the channel 35 adjacent the bottom wall of the laser cavity 27, and contains a ground electrode 37 that is plated on the top and sides of the groove 35. Alternatively, the ground electrode 37 may be plated solely on the top of the groove 35. The plated ground electrode 37 is coupled to ground via appropriate connections, such as a downwardly extending pin 39 shown in FIG. 1. The ground electrode 37 extends along the groove 35 for a large portion of the longitudinal dimension of the laser cavity 27.

Although disclosed as a plated electrode, the ground electrode 37 may be of a different structure, such as a bulk electrode which extends down through the channel 33, and is appropriately secured in place. Also, the channel 33 may be formed without the groove 35, in which case an appropriate ground electrode would be plated or butted against the flat top of the channel 33.

While the electrode 20 has been described as the exciter electrode and the electrode 37 has been described as the ground electrode, their functions may readily be interchanged, with appropriate changes to their structures and with appropriate feeds and connections. Also, the electrodes 20, 37 may be readily configured to provide a split feed whereby neither electrode is connected to ground. In such case, the electrode 37 would be replaced with an electrode structure similar to the electrode structure 20. Split feed circuits are well known and may be utilized as required.

Figure 2:
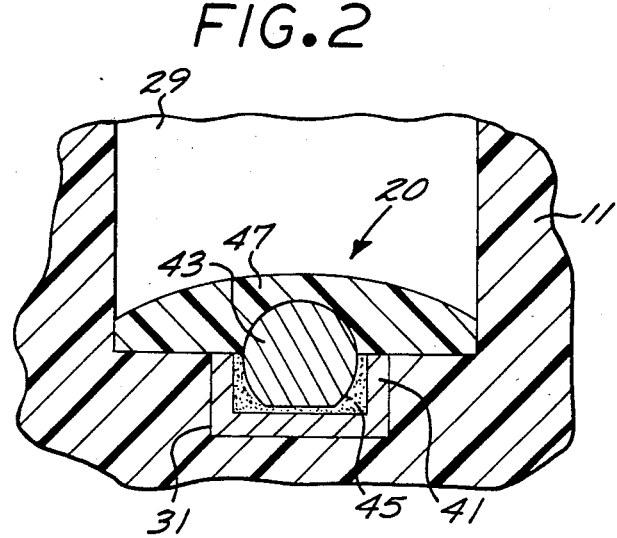
FIG. 2 is a detail sectional view of the electrode structure of the invention.

Referring now to FIG. 2, shown therein is a detail sectional view of the electrode structure 20 of the laser system 10, and which includes an electrode 41 that is plated within the groove 31 of the top dielectric block 11. The electrode 41 may be plated on the bottom and sides of the groove 31, or may be plated solely on the bottom of the groove 31. A bulk electrode 43, located above and adjacent to the plated electrode 41, shields the plated electrode 41. As shown, the bulk electrode 43 may have a principally circular and partially flat cross section so as to provide a flat surface facing the plated electrode 41.

The bulk electrode 43 is conductively coupled to the plated electrode 41 by a layer 45 of a compliant conductive material that is interposed between them. By way of example, the conductive material layer 45 may be indium which provides advantages in the manufacture of the electrode structure 20 that is discussed further herein.

The bulk electrode 43 is secured in place by a low loss dielectric potting structure 47 which also encapsulates the plated electrode 41, the bulk electrode 43, and the conductive material layer 45. The dielectric potting structure 47 preferably has a high dielectric constant (e.g., 9.5) so that it functions to channel the RF electric field away from the non-active gas which is present outside the encapsulating dielectric potting structure 47, which tends to prevent extraneous discharges. By way of example, the dielectric potting structure 47 may be made of a mixture that includes powdered alumina.

The foregoing described electrode structure 20 is provided to avoid gaps between the flat face of the bulk electrode 43 and the plated electrode 41 which might be present if the bulk electrode 43 were butted directly against the plated electrode 41. The electrode structure 20 is further configured to provide smooth conductive surfaces to the extent practicable.

Figure 3:
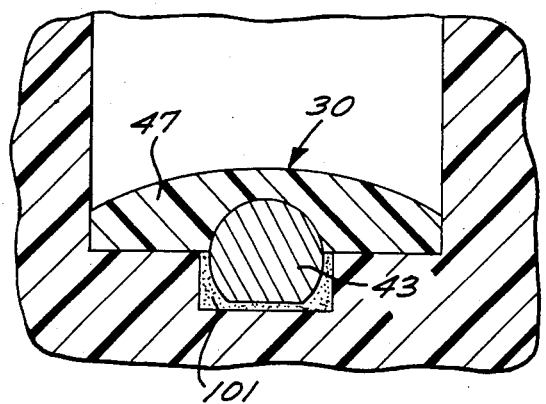
FIG. 3 is another embodiment of the electrode structure of the invention.
Figure 4:
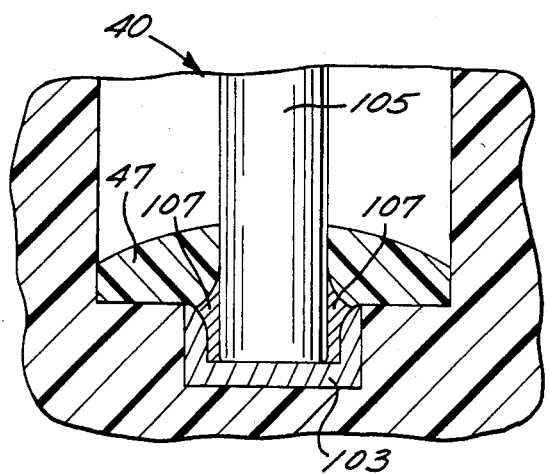
FIG. 4 is a further embodiment of the electrode structure of the invention.

It should be readily understood that various modifications may be made to the electrode structure 20. For example, referring to the electrode structure 30 of FIG. 3, a compliant conductor 101 may be utilized instead of the plated electrode 41 and the compliant conductive layer 45 of the electrode structure 20 of FIG. 2. Also, the plated electrode 41, the compliant conductive material layer 45, and the bulk electrode 43 may be replaced with a plated electrode having rounded edges and brazed bulk feed contacts, as illustrated by the electrode structure 40 of FIG. 4. Specifically, the electrode structure 40 includes a plated electrode 103 with rounded edges, and further includes a bulk feed contact 105 which is coupled to the plated electrode 103 by brazed regions 107. The bulk feed contact 105 extends only for a portion of the longitudinal dimension of the plated electrode 103.

Figure 5:
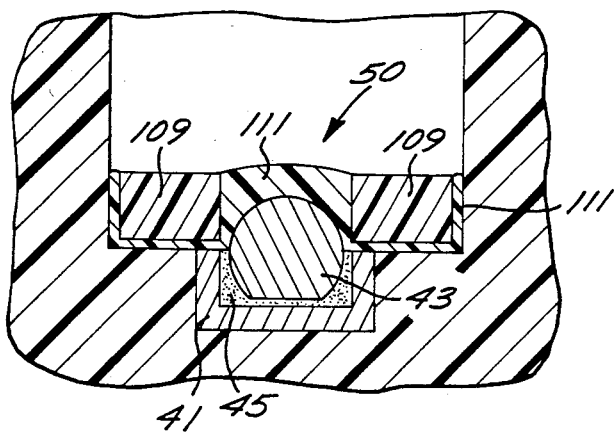
FIG. 5 is an alternate embodiment of the electrode structure of the invention.

As another alternative, bulk ceramic may be utilized instead of part or all of the potting material 47. Referring to FIG. 5, shown therein is an electrode structure 50 which includes bulk ceramic inserts 109 on either side of the bulk electrode 43. Dielectric potting filler 111 is interposed between the bulk ceramic inserts 109 above the bulk electrode 43, and is also placed on the outside of and below the bulk ceramic inserts 109. The dielectric potting filler 111 may be of the same material as the dielectric potting structure 47 of the electrode structure 20 of FIG. 2.

Also, the dielectric potting structure 43 of FIG. 2 and the dielectric potting filler 111 of FIG. 5 may be made of an appropriate low loss dielectric such as a ceramic cement, glass, glass frit, or mica.

The disclosed structure may be advantageously utilized in a folded laser structure which typically includes two parallel laser cavities which are optically coupled at one end. Such laser cavities may be provided by two side by side structures where each is similar to the structure formed by the top and bottom dielectric blocks 11, 13 and associated electrodes of the laser 10. The laser cavity structures are secured in a common elongated housing having appropriate optical mounts at each end in alignment with the laser cavities. The housing and optical mounts are hermetically sealed to form a vacuum vessel. Preferably, the housing of a conductive material so that it provides RF shielding.

Alternatively, the laser cavities in a folded laser may be formed with a single top dielectric block with two downward facing channels which together with a single bottom dielectric block form two parallel laser cavities.

By way of example, the foregoing described electrode structure 20 may be manufactured as follows. An appropriate conductive material such as copper, aluminum, or nickel is plated in the groove 31 to form the plated electrode. A layer of indium is then placed on the plated electrode 41 to form the conductive layer 45. A bulk electrode appropriately fabricated with a principally circular cross section and a flat bottom surface is pressed into place in the indium layer with the flat bottom surface facing the portion of the plated electrode on the bottom of the groove 31.

The plated electrode 41, the bulk electrode 43, and the indium layer 45 are covered with a low loss and low outgassing dielectric mixture which also extends across the width of the upward facing channel 29. For example, such dielectric mixture may include powdered alumina, water, and alcohol. The dielectric mixture is air dried and then coated with a solution of water and potassium silicate. The coated structure is vacuum baked at approximately 500° C. to drive off moisture and t form the dielectric potting structure 47. Pursuant to baking, the potassium silicate binds with the alumina to form a rigid outer region which includes a hard protective coating.

In the foregoing process, indium is advantageously utilized since it has a low vapor pressure. Particularly, although indium has a low melting point of 160° C., it has a very high boiling point of 2000° C. Thus, the indium layer does not evaporate or contaminate the dielectric material or any other portion of the laser structure during vacuum baking at 500° C.

Alternatively, gold foil may be utilized instead of indium. When the laser structure 10 is initially operated, the gold will be mechanically bonded to the plated electrode 41 and the bulk electrode 43 by diffusion bonding that occurs as a result of current flow in the electrodes. The resulting electrode structure with gold foil would be schematically very similar to the electrode structure 20 of FIG. 2, except that the conductive layer 45 would be gold foil.

It should be readily appreciated that the foregoing has been a description of an electrode structure for vacuum vessel contained RF laser structures which advantageously minimizes extraneous RF discharges. As a result, optimum gas pressures and excitation frequencies may be readily utilized; and a wider range of operating frequencies, power loading, and laser gas pressures may also be utilized. The disclosed electrode structure further permits the RF laser cavity structure to be secured within a compact conductive shielding vacuum vessel, and may be advantageously utilized in folded laser structures. Also, the disclosed electrode structure allows for more consistent and higher manufacturing yields, and for longer laser operating lifetimes.

Although the foregoing has been a description and illustration of specific embodiments of the invention, various modifications and changes thereto can be made by persons skilled in the art without departing from the scope and spirit of the invention as defined by the following claims.

What is claimed is:

1. An electrode structure for a vacuum vessel-contained RF laser having an elongated laser cavity defined at least in part by a dielectric block within said vacuum vessel, comprising:
   an elongated adjacent the laser cavity and extending along the elongation direction of the laser cavity;
   conductive means in contact with an contiguously extending along said electrode and cooperating with said electrode to provide a conductor structure having smooth conductive surfaces; and
   a dielectric structure entirely encapsulating said electrode and said conductive means in conjunction with the dielectric block, so as to suppress extraneous discharges outside the laser cavity by controlling the electric field generated when RF energy is applied to the electrode structure.

2. The electrode structure of claim 1 wherein said electrode comprises a plated electrode that is dielectrically separated from the laser cavity.

3. The electrode structure of claim 2 wherein said conductive means includes:
   an elongated bulk electrode; and
   conductive material for conductively coupling said bulk electrode to said plated electrode.

4. The electrode structure of claim 3 wherein said bulk electrode comprises an elongated conductive rod having a principally circular cross-section and a flat surface facing said plated electrode, and wherein said conductive material has a low melting point and a high boiling point.

5. The electrode structure of claim 4 wherein said conductive material includes indium.

6. The electrode structure of claim 3 wherein said bulk electrode comprises an elongated conductive rod having a principally circular cross-section and a flat surface facing said plated electrode, and wherein said conductive material includes gold foil.

7. The electrode structure of claim 1 wherein said elongated electrode comprises a compliant conductive material that is dielectrically separated from the laser cavity.

8. The electrode structure of claim 7 wherein said conductive means includes an elongated bulk electrode pressed against said compliant conductive material.

9. The electrode structure of claim 8 wherein said compliant conductive means includes indium.

10. The electrode structure of claim 1 wherein said dielectric structure includes alumina.

11. The electrode structure of claim 10 wherein said dielectric structure includes potassium silicate.

12. The electrode structure of claim 11 wherein said dielectric structure includes a hardened protective outer surface which includes said potassium silicate.

13. An electrode structure for a vacuum vessel-contained RF laser having an elongated laser cavity defined at least in part by a dielectric block within the vacuum vessel, comprising:
conductive means adjacent the laser cavity and extending along the elongation direction of the laser cavity for selectively generating an electric field within the laser cavity; and
a dielectric structure entirely encapsulating said conductive means in conjunction with said dielectric block for controlling the electric field within the vacuum vessel but outside the laser cavity.

14. The electrode structure of claim 13 wherein said conductive means comprises:
an elongated layer of compliant conductive material; and
an elongated bulk electrode pressed against said compliant conductive material.

15. The electrode structure of claim 14 wherein said compliant conductive material includes indium.

16. The electrode structure of claim 13 wherein said conductive means comprises a plated electrode all of whose edges are rounded.

17. The electrode structure of claim 13 wherein said dielectric structure has a dielectric constant on the order of 10 so as to channel any RF electric field that is outside the laser cavity away from non-active gas that is present in the vacuum vessel.

18. The electrode structure of claim 17 wherein said dielectric structure includes alumina.

19. The electrode structure of claim 18 wherein said dielectric structure includes potassium silicate.

20. The electrode structure of claim 19 wherein said dielectric structure includes a hardened protective outer surface which includes said potassium silicate.

21. The electrode structure of claim 1 wherein said dielectric structure comprises a dielectric potting compound in its entirety.

22. The electrode structure of claim 1 wherein said dielectric structure includes at least one ceramic insert and a dielectric potting compound immediately adjacent said ceramic insert and said dielectric block.

* * * * *